US012057630B2

(12) United States Patent
Zhu et al.

(10) Patent No.: US 12,057,630 B2
(45) Date of Patent: Aug. 6, 2024

(54) ANTENNA ARRAYS BASED ON THREE-DIMENSIONAL SPECIAL-SHAPED WAVE-ABSORBING STRUCTURES

(71) Applicants: Hohai University, Nanjing (CN); Changsha University of Science & Technology, Changsha (CN)

(72) Inventors: Haoran Zhu, Nanjing (CN); Xin Yu, Changsha (CN); Jianlong Zheng, Changsha (CN); Zhi Xu, Nanjing (CN); Guofang Wei, Nanjing (CN); Dongsheng Ma, Nanjing (CN)

(73) Assignees: HOHAI UNIVERSITY, Nanjing (CN); CHANGSHA UNIVERSITY OF SCIENCE & TECHNOLOGY, Changsha (CN)

( * ) Notice: Subject to any disclaimer, the term of this patent is extended or adjusted under 35 U.S.C. 154(b) by 0 days.

(21) Appl. No.: 18/407,344

(22) Filed: Jan. 8, 2024

(65) Prior Publication Data

US 2024/0162604 A1 May 16, 2024

Related U.S. Application Data

(63) Continuation of application No. PCT/CN2023/088832, filed on Apr. 18, 2023.

(30) Foreign Application Priority Data

Nov. 11, 2022 (CN) ........................ 202211414432.8

(51) Int. Cl.
*H01Q 17/00* (2006.01)
*H01Q 1/52* (2006.01)

(52) U.S. Cl.
CPC .......... *H01Q 1/523* (2013.01); *H01Q 17/008* (2013.01)

(58) Field of Classification Search
CPC .......... H01Q 1/521–523; H01Q 9/285; H01Q 21/065; H01Q 17/00; H01Q 21/00
See application file for complete search history.

(56) References Cited

U.S. PATENT DOCUMENTS 7,420,522 B1 * 9/2008 Steinbrecher ........ H01Q 17/008 343/893
11,342,682 B2 * 5/2022 Pelletti .................. H01Q 1/007
(Continued)

FOREIGN PATENT DOCUMENTS

CN 104269658 A 1/2015
CN 210401692 U 4/2020
(Continued)

OTHER PUBLICATIONS

Sun Wenbo, "Design of UWB Antenna for Ground Penetrating Radar Systems," May 2021.
(Continued)

*Primary Examiner* — Hasan Islam
(74) *Attorney, Agent, or Firm* — Pilloff Passino & Cosenza LLP; Rachel K. Pilloff; Sean A. Passino

(57) ABSTRACT

Provided are antenna arrays based on three-dimensional special-shaped wave-absorbing structures by the disclosure, and includes an antenna array fixing plate and a plurality of antenna array units, where the antenna array units are sequentially fixed on the antenna array fixing plate; each of the plurality of antenna array units includes an antenna transmitting channel, two antenna receiving channels and a pair of three-dimensional special-shaped wave-absorbing structures; the antenna transmitting channel is used for transmitting antenna signals; the antenna receiving channels are used for receiving the antenna signals; and the three-dimensional special-shaped wave-absorbing structures are
(Continued)

used for isolating antenna signals of antenna transmitting channels of other antenna array units.

3 Claims, 2 Drawing Sheets

(56) References Cited

U.S. PATENT DOCUMENTS

| | | | | |
|---|---|---|---|---|
| 11,721,912 | B2 * | 8/2023 | Futagami | H01Q 21/065 343/824 |
| 2005/0001757 | A1 | 1/2005 | Shinoda et al. | |

FOREIGN PATENT DOCUMENTS

| | | | |
|---|---|---|---|
| CN | 111446550 | A | 7/2020 |
| CN | 112134031 | A | 12/2020 |
| CN | 213023603 | U | 4/2021 |
| CN | 217641795 | U | 10/2022 |
| CN | 115693088 | A | 2/2023 |
| JP | 2010210297 | A | 9/2010 |
| JP | 2019041224 | A | 3/2019 |
| WO | 2015072953 | A1 | 5/2015 |

OTHER PUBLICATIONS

First Office Action for China Application No. 202211414432.8, mailed Oct. 27, 2023.

Notification to Grant Patent for China Application No. 202211414432.8, mailed Nov. 22, 2023.

First Search Report for China Application No. 202211414432.8, mailed Oct. 24, 2023.

Supplementary Search Report for China Application No. 202211414432.8, mailed Nov. 15, 2023.

International Search Report for PCT/CN2023/088832, mailed Jul. 21, 2023.

* cited by examiner

ANTENNA ARRAYS BASED ON THREE-DIMENSIONAL SPECIAL-SHAPED WAVE-ABSORBING STRUCTURES

CROSS-REFERENCE TO RELATED APPLICATIONS

This application is a continuation of PCT/CN2023/088832, filed on Apr. 18, 2023, and claims priority of Chinese Patent Application No. 202211414432.8, filed on Nov. 11, 2022, the entire contents of which are incorporated herein by reference.

TECHNICAL FIELD

The disclosure belongs to the technical field of microwaves, and in particular to antenna arrays based on three-dimensional special-shaped wave-absorbing structures.

BACKGROUND

The conventional two-dimensional ground penetrating radar has a small number of antennas with a low density, with small road coverage, slow detection speed and low efficiency. Compared with the conventional two-dimensional ground penetrating radar, an ultra-wideband pulsed three-dimensional array ground penetrating radar has many advantages, such as high antenna density, three-dimensional data slicing/perspective display, accurate disease interpretation and so on. Recently, the three-dimensional array ground penetrating radar is developing to achieve a higher detection speed and a better detection accuracy. The higher detection speed requires the ground penetrating radar to be operated in a more stable electromagnetic working environment, so as to reduce the fluctuation of detection performance caused by the rapid change of external environment as much as possible; the better detection accuracy may be achieved by further improving the signal-to-noise ratio of the ground penetrating radar to be capable of accurately detecting and identifying millimeter-scale cracks in expressway. To optimize the performance in these respects, it is necessary to improve the interchannel isolation among multiple test channels of the array radar and improve time-domain characteristics of radio-frequency signals of a transmitting antenna and a receiving antenna. Based on distribution characteristics of the test channels of three-dimensional array ground penetrating radar and the above detection requirements of high-speed and high-precision, the disclosure provides antenna arrays based on three-dimensional special-shaped wave-absorbing structures.

SUMMARY

The disclosure proposes antenna arrays based on three-dimensional special-shaped wave-absorbing structures; in the disclosure, structure parameters and attenuation characteristics of the special-shaped wave-absorbing structure are designed according to distribution characteristics of the transmitting antenna and the receiving antenna of each test channel and working characteristics of electromagnetic waves, therefore, an interchannel isolation among test channels of a ground penetrating radar is improved, a ringing effect of a time domain antenna radiation of the ground penetrating radar is improved, and an anti-environmental interference ability of the ground penetrating radar in a high-speed detection state is improved.

In order to achieve the above purpose, the disclosure provides the antenna arrays based on three-dimensional special-shaped wave-absorbing structures, including an antenna array fixing plate and multiple antenna array units, where the multiple antenna array units are sequentially fixed on the antenna array fixing plate;

- each of the multiple antenna array units includes an antenna transmitting channel, two antenna receiving channels and a pair of three-dimensional special-shaped wave-absorbing structures;
- the antenna transmitting channel is used for transmitting antenna signals;
- the antenna receiving channels are used for receiving the antenna signals; and
- the pair of three-dimensional special-shaped wave-absorbing structures are used for isolating antenna signals of antenna transmitting channels of other antenna array units.

Optionally, the antenna transmitting channel is located at a central position of the antenna receiving channels in pairs;

- the antenna receiving channels adopt a left-right symmetrical paired design;
- the two antenna receiving channels in each of the multiple antenna array units share the antenna transmitting channel.

Optionally, a position relation between the antenna transmitting channel and the pair of three-dimensional special-shaped wave-absorbing structures in each of the multiple antenna array units is as follows:

- the antenna transmitting channel is taken as a center, the three-dimensional special-shaped wave-absorbing structures are respectively distributed on both sides of the antenna transmitting channel and form the left-right symmetrical paired design.

Optionally, the three-dimensional special-shaped wave-absorbing structures are conical structures;

- the three-dimensional special-shaped wave-absorbing structures adopt wave-absorbing materials.

Optionally, a method for determining placement positions of the three-dimensional special-shaped wave-absorbing structures includes:

- determining the placement positions of the three-dimensional special-shaped wave-absorbing structures according to oblique long sides of the three-dimensional special-shaped wave-absorbing structures;
- where the oblique long sides of the three-dimensional special-shaped wave-absorbing structures are parallel to a connection direction of feeding centers of a transmitting antenna and a corresponding receiving antenna.

Optionally, a method for determining heights of the three-dimensional special-shaped wave-absorbing structures includes following steps:

- connecting a vertex of a bottom surface away from the oblique long side with a midpoint of the oblique long side in each of the three-dimensional special-shaped wave-absorbing structures;
- connecting a vertex of an oblique plane away from the oblique long side with the midpoint of the oblique long side in each of the three-dimensional special-shaped wave-absorbing structures; and
- forming an included angle through two connecting lines, and obtaining a height of each of three-dimensional special-shaped wave-absorbing structures according to the included angle.

Optionally, the included angle ranges from 20° to 45°.

The disclosure has following technical effects: the antenna array based on a three-dimensional special-shaped wave-absorbing structure is disclosed by the disclosure, where the bottom structure of the special-shaped wave-absorbing structure is parallel to the connecting line direction of the feed center of the transmitting antenna and the receiving antenna, so that the interchannel isolation among the test channels of the ground penetrating radar is improved, the ringing effect of a time domain antenna radiation of the ground penetrating radar is improved, the anti-environmental interference ability of the ground penetrating radar in the high-speed detection state is improved, and the signal-to-noise ratio is improved, so that the millimeter-scale cracks in the expressway may be accurately detected and identified.

BRIEF DESCRIPTION OF THE DRAWINGS

The accompanying drawings, constituting a part of the disclosure, are used to provide a further understanding of the disclosure. The illustrative embodiments of the disclosure and the descriptions are used to explain the disclosure, and do not constitute an improper limitation of the disclosure. In the attached drawings.

DETAILED DESCRIPTION OF THE EMBODIMENTS

It should be noted that the embodiments in the disclosure and the features in the embodiments may be combined with each other without conflict. The present disclosure is described in detail with reference to the attached drawings and embodiments.

It should be noted that the steps shown in the flowchart of the accompanying drawings may be executed in a computer system such as a set of computer-executable instructions, and although the logical order is shown in the flowchart, in some cases, the steps shown or described may be executed in a different order from here.

Figure 1:
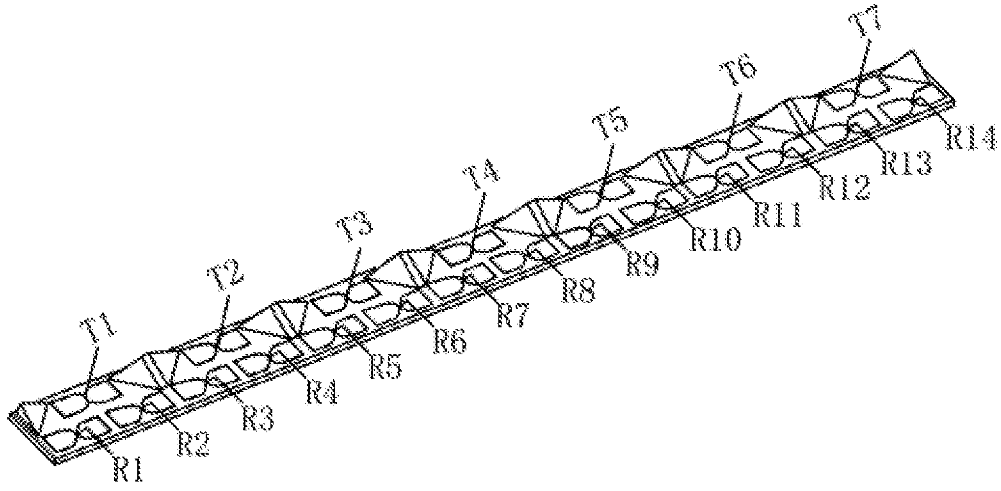
FIG. 1 is a schematic diagram of antenna arrays of an ultra-wideband pulse three-dimensional array ground penetrating radar according to an embodiment of the present disclosure.
Figure 2:
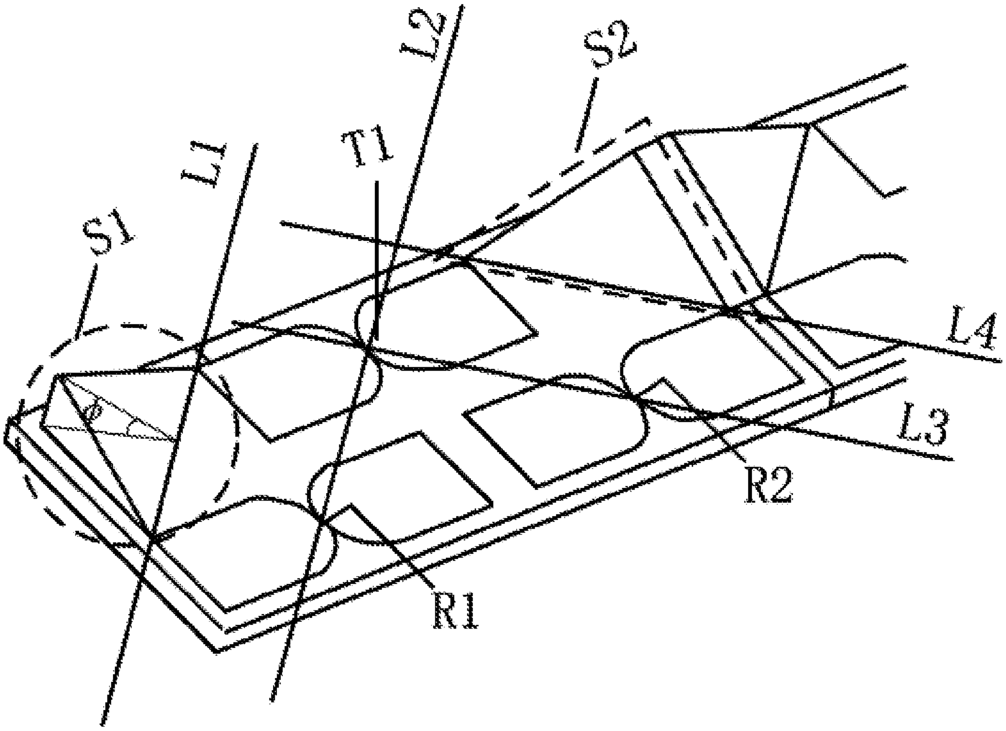
FIG. 2 is a schematic diagram of a paired design of three-dimensional special-shaped wave-absorbing structures according to the embodiment of the present disclosure.

As shown in FIG. 1 and FIG. 2, antenna arrays based on three-dimensional special-shaped wave-absorbing structures are provided in the embodiment, including an antenna array fixing plate and multiple antenna array units, where the multiple antenna array units are sequentially fixed on the antenna array fixing plate;

each of the multiple antenna array units includes an antenna transmitting channel, two antenna receiving channels and a pair of three-dimensional special-shaped wave-absorbing structures;

the antenna transmitting channel is used for transmitting antenna signals;

the antenna receiving channels are used for receiving the antenna signals; and the pair of three-dimensional special-shaped wave-absorbing structures are used for isolating antenna signals of antenna transmitting channels of other antenna array units.

In a further optimization scheme, the antenna transmitting channel is located at a central position of the antenna receiving channels in pairs;

the antenna receiving channels adopt a left-right symmetrical paired design;

the two antenna receiving channels in each of the multiple antenna array units share the antenna transmitting channel.

In a further optimization scheme, a position relation between the antenna transmitting channel and the pair of three-dimensional special-shaped wave-absorbing structure in each of the multiple antenna array units is as follows:

the antenna transmitting channel is taken as a center, the three-dimensional special-shaped wave-absorbing structures are respectively distributed on both sides of the antenna transmitting channel and form the left-right symmetrical paired design.

In a further optimization scheme, the three-dimensional special-shaped wave-absorbing structures are conical structures;

the three-dimensional special-shaped wave-absorbing structures adopt wave-absorbing materials.

In a further optimization scheme, a method for determining placement positions of the three-dimensional special-shaped wave-absorbing structures includes:

determining the placement positions of the three-dimensional special-shaped wave-absorbing structures according to the oblique long sides of the three-dimensional special-shaped wave-absorbing structures;

wherein the oblique long sides of the three-dimensional special-shaped wave-absorbing structures are parallel to a connection direction of feeding centers of a transmitting antenna and a corresponding receiving antenna.

In a further optimization scheme, a method for determining heights of the three-dimensional special-shaped wave-absorbing structures includes following steps:

connecting a vertex of a bottom surface away from the oblique long side with a midpoint of the oblique long side in each of the three-dimensional special-shaped wave-absorbing structures;

connecting a vertex of an oblique plane away from the oblique long side with the midpoint of the oblique long side in each of the three-dimensional special-shaped wave-absorbing structures; and forming an included angle through the two connecting lines, and obtaining the height of each of the three-dimensional special-shaped wave-absorbing structure according to the included angle.

In a further optimization scheme, the included angle ranges from 20° to 45°.

Ultra-wideband pulse three-dimensional array ground penetrating radar usually transmits and receives electromagnetic waves by transmitting antenna arrays and receiving antenna arrays. As shown in FIGS. 1, T1-T7 are transmitting antenna arrays composed of transmitting antennas; R1-R14 are receiving antenna arrays composed of receiving antennas. The pairing relationship between test channels 1 to 14 and transmitting antennas and receiving antennas is shown in the following Table 1, which shows the pairing relationship between test channels and transmitting antennas and receiving antennas.

TABLE 1

| | Channel 1 | Channel 2 | Channel 3 | Channel 4 | Channel 5 | Channel 6 | Channel 7 |
|---|---|---|---|---|---|---|---|
| Transmitting antenna | T1 | T1 | T2 | T2 | T3 | T3 | T4 |
| Receiving antenna | R1 | R2 | R3 | R4 | R5 | R6 | R7 |

| | Channel 8 | Channel 9 | Channel 10 | Channel 11 | Channel 12 | Channel 13 | Channel 14 |
|---|---|---|---|---|---|---|---|
| Transmitting antenna | T4 | T5 | T5 | T6 | T6 | T7 | T7 |
| Receiving antenna | R8 | R9 | R10 | R11 | R12 | R13 | R14 |

It may be seen from the Table 1 and FIG. 1 that the test channel 1 and the test channel 2 share the transmitting antenna T1, that is, the test channel 1 consists of the transmitting antenna T1 and the receiving antenna R1; and the test channel 2 consists of the transmitting antenna T1 and the receiving antenna R2. Other test channels are also in the form of shared transmitting antennas, so the three-dimensional shaped wave-absorbing structures proposed by the disclosure are also designed in pairs with each shared transmitting antenna as a unit, as shown in FIG. 2, where T1 is a transmitting antenna array composed of the transmitting antennas, S1-S2 are both pyramids, L1 is an oblique long side direction of the S1 structure at the transmitting antenna T1 side, L2 is a connecting line direction between a center of the transmitting antenna T1 structure and a center of the receiving antenna R1 structure, L3 is a connecting line direction between a center of the transmitting antenna T1 structure and a center point of the receiving antenna R2 structure, L4 is an oblique long side direction of the S2 structure at the transmitting antenna T1 side, and R1-R2 are both receiving antenna arrays composed of receiving antennas.

The design principle and explanation of parameters of three-dimensional special-shaped absorbing structure are as follows.

1. S1 and S2 exist in pairs.

The three-dimensional array ground penetrating radar adopts the form of shared transmitting antennas, and the three-dimensional special-shaped absorbing structure is designed in left-right symmetrical pairs with each shared transmitting antenna as the center, so that a spatial isolation structure may be formed between different transmitting antennas, and the isolation between adjacent transmitting antennas may be improved through the absorption characteristics of absorbing materials. At the same time, the left-right symmetrical structure design does not form obstacles in the propagation space/path between the shared transmitting antenna and the two receiving antennas, thus ensuring the antenna receiving efficiency required by the design.

2. The bottom structure of the S1 structure in L1 direction is parallel to the connecting line direction L2 of feeding centers of the transmitting antenna T1 and the receiving antenna R1.

A design idea that the L1 direction is parallel to the L2 direction is an important feature of the innovative design of the disclosure. Through the design idea, it may first ensure that the wave-absorbing structures are similar to the relative position of the transmitting antenna and the receiving antenna, so as to ensure a maximum shape similarity in working environment of the transmitting antenna and the receiving antenna, and then ensure that the transmitting/receiving electromagnetic waveform reflects the target characteristics to the greatest extent. In addition, the L1 direction is parallel to the L2 direction, which may make the wave-absorbing structure play an optimization effect similar in order of magnitude to the time domain ringing phenomenon of the transmitting antenna and the receiving antenna, and further ensure the performance consistency of the transmitting antenna and the receiving antenna.

3. The bottom structure of the S2 structure in L4 direction is parallel to the connecting line direction L3 of feeding centers of the transmitting antenna T1 and the receiving antenna R2.

4. An included angle Φ between two middle lines on the bottom of the S1 structure in L1 direction may be designed in the range of 20°-45°, and similarly, an included angle Φ between two middle lines on the bottom of the S2 structure in L4 direction may be designed in the range of 20°-45';

the included angle Φ between the two middle lines on the bottom of S1 wave-absorbing structure in L1 direction may be designed in the range of 20°-45°, which is determined by radiation pattern characteristics of the transmitting/receiving antenna. When Φ is less than 45°, the wave-absorbing structure has an acceptable minimum impact on the radiation and receiving characteristics of the antenna, and when Φ is greater than 20°, the absorbing structure may effectively reduce the interference of external environment clutter on the antenna signals.

The antenna array based on a three-dimensional special-shaped wave-absorbing structure is disclosed by the disclosure, where the bottom structure of the special-shaped wave-absorbing structure is parallel to the connecting line direction of the feed center of the transmitting antenna and the receiving antenna, so that the isolation between the test channels of the ground penetrating radar is improved, the ringing effect of a time domain antenna radiation of the ground penetrating radar is improved, the anti-environmental interference ability of the ground penetrating radar in the high-speed detection state is improved, and the signal-to-noise ratio is improved, so that the millimeter-scale cracks in the expressway may be accurately detected and identified.

The above describes only the preferred embodiments of the disclosure, but the protection scope of the disclosure is not limited to this. Any change or replacement that may be easily thought of by a person familiar with this technical field within the technical scope disclosed in the disclosure should be covered by the disclosure. Therefore, the protection scope of the disclosure should be based on the protection scope of the claims.

What is claimed is:

1. Antenna arrays based on three-dimensional special-shaped wave-absorbing structures, comprising:

an antenna array fixing plate and a plurality of antenna array units, wherein the plurality of antenna array units are sequentially fixed on the antenna array fixing plate;

each of the plurality of antenna array units comprises an antenna transmitting channel, two antenna receiving channels and a pair of three-dimensional special-shaped wave-absorbing structures;

the antenna transmitting channel is used for transmitting antenna signals;

the two antenna receiving channels are used for receiving the antenna signals;

the pair of three-dimensional special-shaped wave-absorbing structures are used for isolating antenna signals of each antenna transmitting channel of the plurality of antenna array units;

the antenna transmitting channel is located at a central position of the antenna receiving channels in pairs;

the antenna receiving channels adopt a left-right symmetrical paired design; and the two antenna receiving channels in each of the plurality of antenna array units share the antenna transmitting channel;

wherein a position relation between the antenna transmitting channel and the pair of three-dimensional special-shaped wave-absorbing structures in each of the plurality of antenna array units is as follows:

the antenna transmitting channel is taken as a center, the three-dimensional special-shaped wave-absorbing structures are respectively distributed on both sides of the antenna transmitting channel and form the left-right symmetrical paired design;

the three-dimensional special-shaped wave-absorbing structures are conical structures; and the three-dimensional special-shaped wave-absorbing structures adopt wave-absorbing materials;

wherein placement positions of the three-dimensional special-shaped wave-absorbing structures are determined according to oblique long sides of the three-dimensional special-shaped wave-absorbing structures; and wherein the oblique long sides of the three-dimensional special-shaped wave-absorbing structures are parallel to a connection direction of feeding centers of a transmitting antenna and a corresponding receiving antenna.

2. The antenna arrays based on the three-dimensional special-shaped wave-absorbing structures according to claim 1, wherein a method for determining heights of the three-dimensional special-shaped wave-absorbing structures comprises following steps:

connecting a vertex of a bottom surface away from the oblique long side with a midpoint of the oblique long side in each of the three-dimensional special-shaped wave-absorbing structures;

connecting a vertex of an oblique plane away from the oblique long side with the midpoint of the oblique long side in each of the three-dimensional special-shaped wave-absorbing structures; and forming an included angle through two connecting lines, and obtaining a height of each of three-dimensional special-shaped wave-absorbing structures according to the included angle.

3. The antenna arrays based on the three-dimensional special-shaped wave-absorbing structures according to claim 2, wherein the included angle ranges from 20° to 45°.

* * * * *